Patented Apr. 26, 1927.

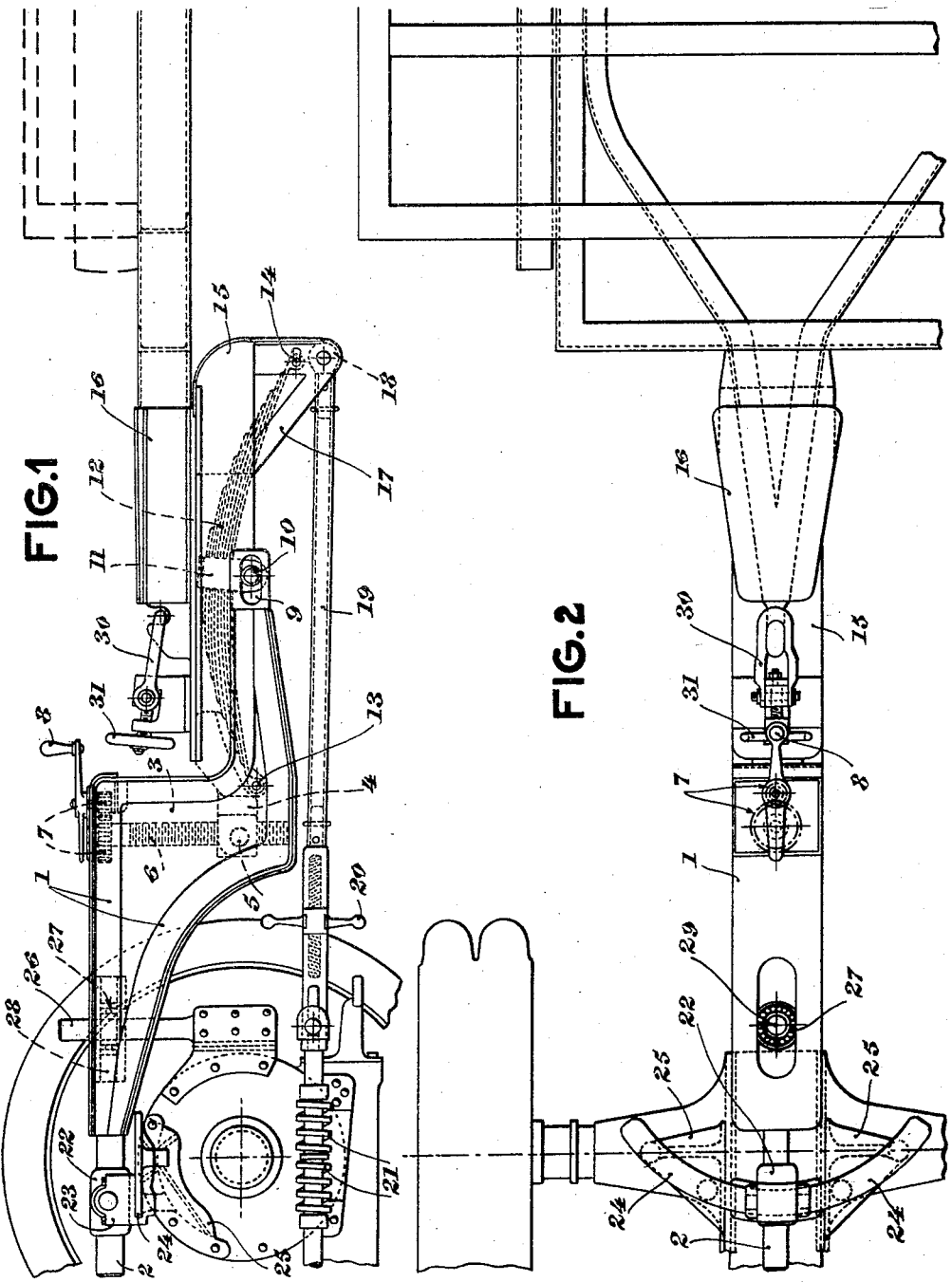

1,626,184

UNITED STATES PATENT OFFICE.

JOSEPH CODER AND LOUIS CODER, OF ST-MARCEL-LES-MARSEILLE, FRANCE.

COUPLING MEANS BETWEEN MOTOR TRACTORS AND THEIR TRAILERS.

Application filed June 25, 1926, Serial No. 118,521, and in France April 26, 1926.

This invention relates to improvements in the coupling means between motor tractors and their trailers.

Existing couplings only imperfectly carry out their functions when as in the present case it is necessary to vary the height of the trailer drawn by a tractor of the Fordson type.

Not only is it impossible to obtain sufficient lock for manœuvering but the resiliency necessary for transmitting the drive is entirely overlooked.

The object of this invention is to improve the mounting, transmission of the drive, regulation of height and braking and also to allow for reduction in the gear above the back axle of the tractor leaving more space for the coupling rod.

According to the invention a coupling rod is rigidly attached to the trailer and comprises a metal bar coupled to a stationary quadrant on the tractor by a member sliding thereon, the bar being pivoted about an axis behind the rear axle of the tractor and a screw adjustment allowing for varying the height of the trailer attachment and a spring absorbing vertical shocks, the drive from the tractor to the trailer being through a tension rod provided with springs for transmitting a drive in either direction.

The invention will be described with reference to the accompanying drawings:—

Fig. 1 is a side elevation.
Fig. 2 is a plan.

A frame 1 is provided at one end with an arm 2 and at the centre with two flanges 3 forming slides for a member 4 mounted on a nut 5 controlled by a screwed rod 6 operated by gear wheels 7 controlled by a hand wheel 8.

The other end of the frame 1 is forked each arm being provided with a bearing 9 for a transverse shaft 10 carrying a bracket 11 affixed to the mid-point of a leaf spring 12. The end 13 of the spring 12 is pivoted to the member 4 and the other end 14 to a member 15 connected to the trailer through a coupling box 16 in which it may be adjustable by a rod 30 and hand wheel 31.

The drive transmitting rod 19 is pivoted to the lower portion 18 of the member 15, stays 17 being provided to strengthen the member 15. The length of the drive transmitting rod 19 may be regulated by a left and right handed nut 20, the rod being connected to the rear axle of the tractor through springs 21 adapted to absorb tensile or compressive shocks.

The arm 2 bears against and is keyed to a quadrant 24 by a pin 22 carried by a circular slide 23. The quadrant 24 is mounted on two symmetrical brackets 25 mounted on the rear axle of the tractor. A vertical shaft 26 also rigidly affixed to the rear axle engages a nut 27 capable of sliding between two faces 28 on the frame 1.

In this manner the pivoting point 29 is behind the tractor back axle and the slide 23 operated by the arm 2 can move over the quadrant 24 on the tractor ensuring the transmission of vertical forces whatever the relative position of the trailer and tractor may be.

The arrangement of the pivoting point behind the back axle also allows for employing a greater steering lock.

The raising of the rear end operated by the handle 8 is obtained by rotating the screw in the nut 5 which causes the member 15 to move vertically. Vertical forces are transmitted to the frame through the spring 12 the member 15 oscillating during the movements of the spring about shackles carried by the nut 5.

What we claim as our invention and desire to protect by Letters Patent is:—

1. Coupling means for uniting trailers to their tractors of the type referred to, comprising in combination with a tractor a vertical shaft mounted to the rear of the back axle of the tractor, a frame pivoting about said shaft, means, mounted above said back axle, for guiding one end of said frame, means for coupling the other end of the frame to the front end of the trailer, screw means for adjusting the inclination of the trailer chassis with respect to the frame, a coupling rod for transmitting the drive from the tractor to the trailer, means for varying the length of said coupling rod, springs for absorbing longitudinal tensile and compressive forces and springs for absorbing vertical forces between the trailer and the tractor.

2. Coupling means for uniting trailers to their tractors of the type referred to comprising in combination with a tractor a vertical shaft mounted to the rear of the back axle of the tractor, a quadrant mounted above said back axle, a frame pivoting about said vertical shaft and sliding by one end over said quadrant, a coupling box provided on the other end of the frame to guide the front end of the trailer, means for coupling the rear end of said frame to the front end of the trailer, screw means for adjusting the inclination of the trailer chassis with respect to the frame, a coupling rod for transmitting the drive from the tractor to the trailer, resilient means for varying the length of said coupling rod and springs for absorbing vertical forces between the trailer and the tractor.

3. Coupling means for uniting trailers to their tractors of the type referred to, comprising in combination with a tractor, a vertical shaft mounted to the rear of the back axle of the tractor, a frame pivoting about said shaft, means mounted above said back axle for guiding one end of said frame, means for coupling the other end of the frame to the front end of the trailer, screw means for adjusting the inclination of the tractor chassis with respect to the frame, a coupling rod for transmitting the drive from the tractor to the trailer, resilient means for varying the length of said coupling rod and a leaf spring hinged at one end on said screw means and at its other end to that part of the frame, which bears said coupling means, the mid point of said spring being affixed to a bracket slidably mounted on said frame.

In witness whereof we affix our signatures.

JOSEPH CODER.
LOUIS CODER.